UNITED STATES PATENT OFFICE.

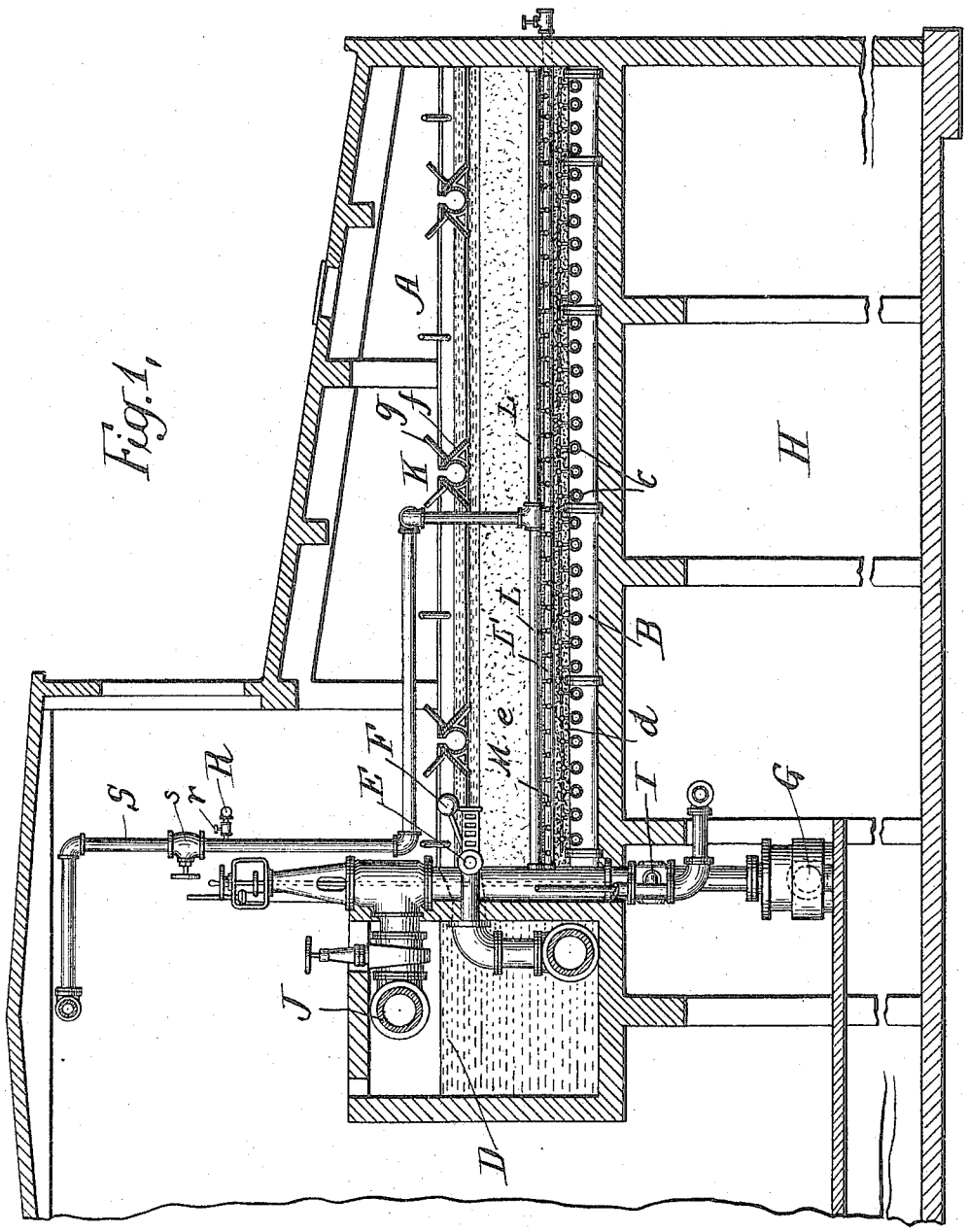

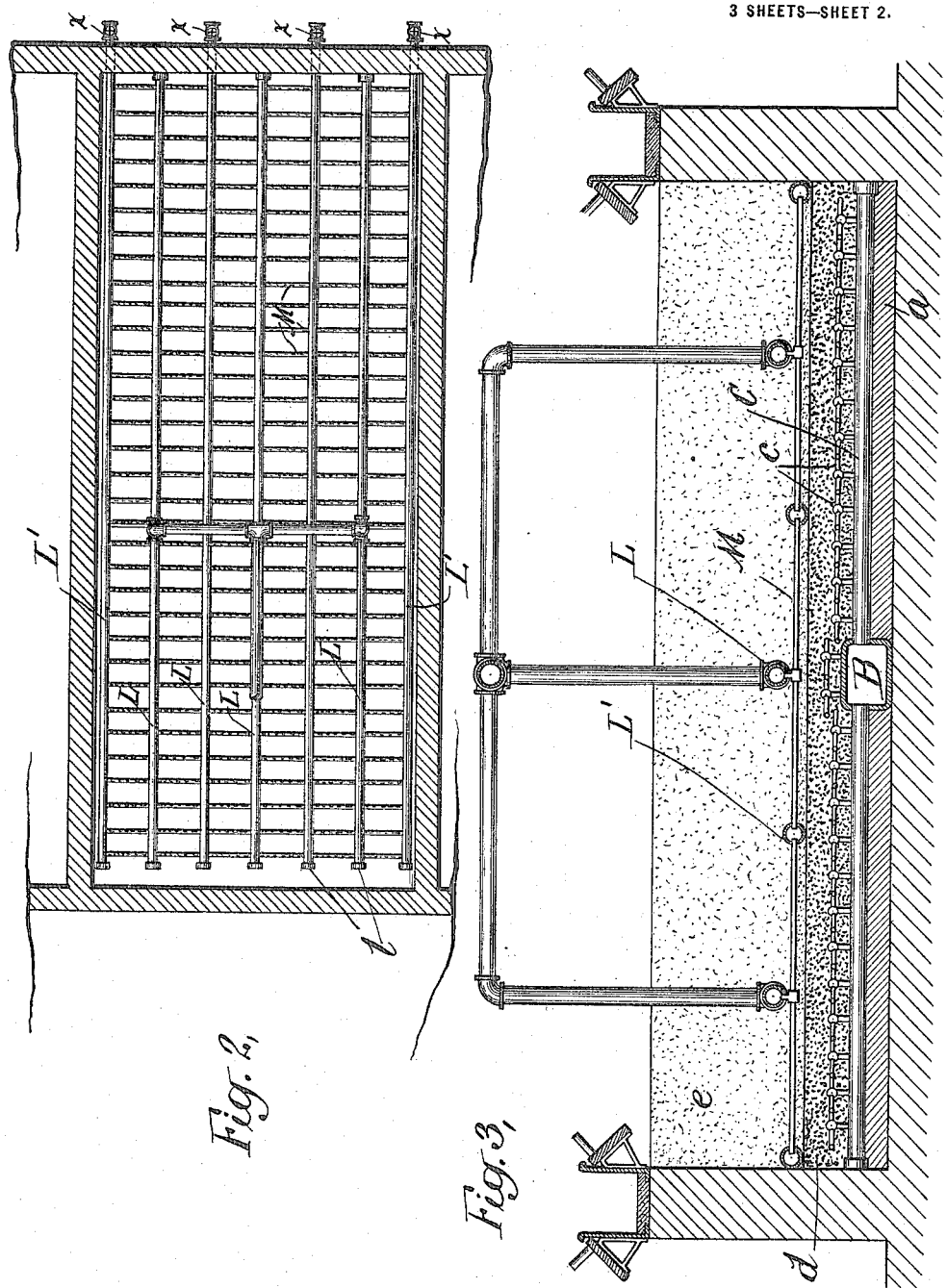

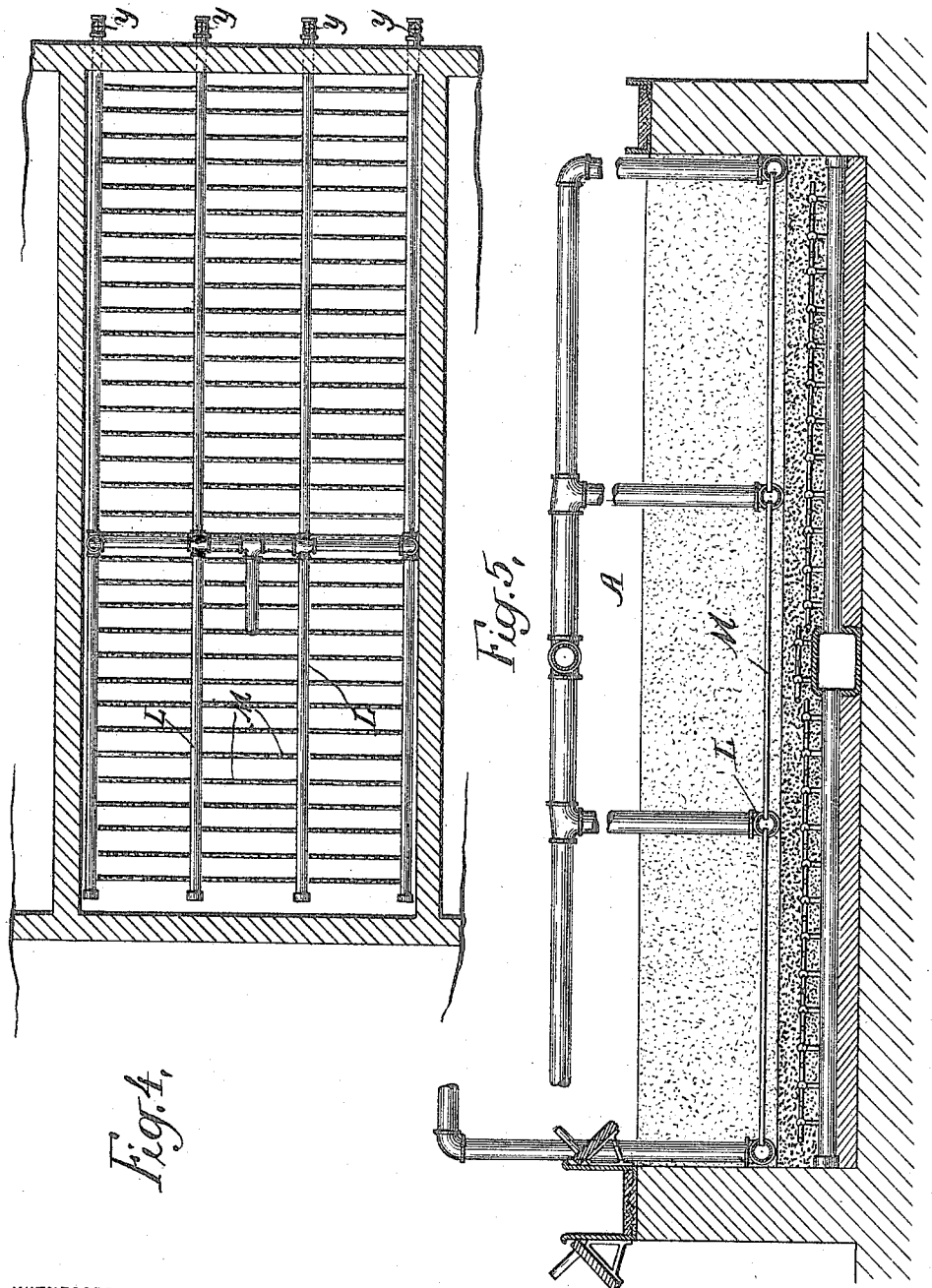

WILLIAM A. STEVENSON, OF FLORENCE, MASSACHUSETTS.

FILTRATION APPARATUS.

1,180,616.  Specification of Letters Patent.  Patented Apr. 25, 1916.

Application filed November 11, 1913. Serial No. 800,263.

*To all whom it may concern:*

Be it known that I, WILLIAM A. STEVENSON, a citizen of the United States, residing at and whose post-office address is Florence, county of Hampshire, State of Massachusetts, have invented certain new and useful Improvements in Filtration Apparatus; and I do hereby declare the following to be a full, clear, and exact description of the invention, such as will enable others skilled in the art to which it appertains to make and use the same.

My invention relates to certain new and useful improvements in filtering beds and is applicable to apparatus of the general type shown, for instance, in United States Letters Patent No. 798,473, granted August 29, 1905, to William W. Wilson, and in United States Letters Patent No. 1069737, granted to me August 12, 1913, in both of which patents there is shown a bed of filtering material within which is located a branched collector conduit for taking off the filtered water and producing a reverse flow of wash water during the operation of cleaning the filter bed and air pipes for introducing currents of air through the filter bed to coöperate with the wash water in opening up or loosening the filtering material, and agitating it during the washing operation. My patent above identified discloses means for preventing the back flow of water into the air pipes, this means including a supplementary water supply for filling the air pipes with water at certain stages of the operation of cleaning the beds.

The present invention is directed more particularly to blow-off means associated with the air pipes of a system closely corresponding to those above mentioned and affords means for freeing the air pipe system of sand or sediment, or other foreign material, which may have entered either with the incoming air or because of reverse flow from the filter bed.

The accompanying drawings illustrate a filtering apparatus of this general type, in which—

Figure 1 is a sectional elevation of the single unit with its necessary adjuncts; Fig. 2 is a partial plan view of the same; Fig. 3 is a partial section transverse to the view of Fig. 1 and showing blow-off tubes connected to the ends of the air pipe branches; and Figs. 4 and 5 are, respectively, a plan view and an elevation of a modified form wherein the air pipe branches are themselves used as the blow-off conduits.

Similar letters of reference indicate similar parts throughout the several views.

In the drawings the filtering basin A is provided with the collector conduit for the filtered water consisting preferably of a main collector pipe B and branches C supported upon suitable grouting $a$, the branches C being further provided with a series of slitted collector tubes $c$. These collector tubes are protected by a layer of gravel $d$ above which the layer of sand $e$ extends, the top of the sand bed being usually about 12 inches below the water level.

Water admitted into basin A from channel D through spreader valve E and maintained at uniform height by float F passes down through the sand and gravel to collector pipes C and B to a rate controller G and discharges into the clear well H. A valve I in the connection to the rate controller may be used to interrupt the flow of water when the filter bed is to be washed.

To supply filtered water for washing the filter bed and removing the thin layer of slime which may collect on the sand, a conduit J is provided having a cut-off valve and connected to the collector pipe B and its branches, so that by closing valve I near the rate controller and opening the valve in conduit J, filtered water may be forced out under pressure into all of the branches of the collector pipe and through the strainers attached to the collector pipe and its branches and up through the sand, where the water will overflow into the waste water channels K which are provided with sand intercepting side boards $f$ with air releasing tubes $g$. This upward flow of wash water loosens up the filtering material, and as the water rises in the bed, the float F actuates the float valve E, thereby shutting off the supply of the unfiltered water to the basin. The rising water carrying with it the fine sediment that has been deposited in and upon the sand layer overflows into the channels K, from which it is conducted to the sewer or other point of discharge.

In connection with the supply of wash water to the filter bed, air under pressure is admitted through the main S and its branches L, and the laterals M, communicating with the said branches. These laterals are provided with a large number of fine slots to permit the air to discharge through the entire area of the bed, and in issuing from these slots the air expands somewhat, making the agitation energetic and greatly increasing the efficiency of the washing process.

During filtration, inasmuch as the filtered water discharges through the rate controller at a point below the sand bed, the suction caused by this negative head tends to produce a vacuum in the slitted air pipes, so that unless some compensating provision is made the closing of the valve I preparatory to opening the valve admitting the supply of filtered wash water under pressure from the conduit J, would be accompanied by an inrush of water from the bed of sand into the system of air pipes before the filtered wash water supply could reach the filter bed. Such an inrush of water into the air pipes would carry in with it more or less fine sand from the filter bed, thereby obstructing the pipes. To avoid this difficulty, means are provided for filling the air pipe system with water from a water pressure main, as R, provided with a suitable cut-off valve $r$, which is opened to admit water to fill the air pipe system L and its laterals M immediately before the valve in the branch leading to the rate controller is closed, so that the air pipes L and their branches M, being already occupied with water, will not be subjected to any inflow from the filter bed. As soon as the supply of wash water reaches the filter bed and begins its upward flow therethrough, the valve $r$ is closed, thereby interrupting the flow of water into the air pipes from the water supply main R, and a valve $s$ is opened, leading from the air pressure main S, thereby driving the water out of the air pipe L and its branches M and admitting into the filter bed a corresponding number of jets of air through the slitted openings of said pipe and its branches, which air, in conjunction with the wash water, opens up and loosens the filtering material, and the wash water passes over into channels K carrying with it the sediment and impurities until the cleaning operation is finished. At any time during the operation of the apparatus, when for any reason it becomes desirable to free the air pipes from water, sand, sediment, or the like, this may be effected readily by blowing water or air through the pipes and out by way of the blow-off means now to be described.

In the construction shown in Figs. 1, 2 and 3, the air pipes L which supply the air laterals M are all dead ended near the walls of chamber A, suitable screw caps $l$ being provided for that purpose, but running parallel with pipes L are a series of blow-off pipes L', each of which runs through the front wall of the apparatus and is provided with a valve $x$, through which material blown from the air pipes may find exit. The air laterals M enter the sides of the blow-off pipes L' as shown in Fig. 3, and with this arrangement the pipes L' form an effective trap to collect sand and sediment and to hold the same until it is blown outward therefrom through valve $x$ by means of air or water supplied under pressure through pipe S.

In the modification illustrated by Figs. 4 and 5, each of the air pipes L is made to serve as its own blow-off pipe, and to this end is projected forwardly through the front end of the apparatus and provided with a valve $y$ which normally is closed, but which can be opened when desired. In this modification the air laterals M enter the sides of pipes L instead of being dropped down with a T fitting, as in the construction of Fig. 3, thereby forming a collecting trap of each pipe L and making it serve the double function of an air supply pipe and a blow-off pipe.

With either of the constructions above described, the valves $x$ or $y$ can be opened in succession or one can be opened simultaneously with another of the series, and the cleaning air or water can therefore be diverted or switched about through the system from tube to tube, thus cleaning not only the blow-off pipes L' of Fig. 3 and L of Fig. 5, but also effectively cleaning the air laterals M.

After cleaning the filter bed by reversing the flow of water through it, as above disclosed, accompanied by the forcible delivery of air upward through the bed, the apparatus may be returned to normal filtering condition, as follows: First, the cock $s$ in the air pressure main S is closed before the valve in the branch leading to the rate controller is opened, and before the valve in the conduit J admitting the wash water is closed. As soon as the valve $s$ is closed, the valve $r$ in the water supply main R is opened and the filtered water from the supply main R drives out the air from air pipe L and its branches M, said air rising with the wash water and making its exit from the filter. The valve in the wash water conduit J may then be closed and the valve in the branch leading to the rate controller may be opened to reëstablish filtration, whereupon the pipe R in the water supply main is again closed.

Other details of the apparatus may be as described in my Patent No. 1069737, above mentioned, and may be operated in the manner and for the purposes therein set forth. Certain features of the apparatus herein disclosed, but not claimed, are claimed in my co-pending application Serial No. 782797, filed August 4, 1913, as a division of the application which matured as Patent No. 1069737.

Having thus described my invention what I claim is:

1. A filtration apparatus having a filter bed, a conduit system contained in said filter bed for collecting the filtered water and for washing the filter bed by a reverse flow, a conduit system including laterals for assisting the washing operation by the admission of air into the filter bed during the reverse flow said laterals being connected so as to receive air at either end while in action and blow-off means for said air system leading through the wall of the filter bed whereby the pipes of said air system may be cleaned; substantially as described.

2. A filtration apparatus having a filter bed, a conduit system contained in said filter bed for collecting the filtered water and for washing the filter bed by a reverse flow, the said system being provided with a discharge pipe whose outlet is below the filter bed so as to establish suction by a negative head during the filtration, an air conduit system including laterals for the admission of air into the filter bed during the reverse flow said laterals being arranged to receive air through either end and outlets for the air system through the wall of the filter bed whereby the air system may be blown out to clear the laterals and their associated pipes of foreign material; substantially as described.

3. A filtration apparatus having a filter bed, a conduit system contained in said filter bed for collecting the filtered water and for washing the filter bed by a reverse flow, the said system being provided with a discharge pipe whose outlet is below the filter bed so as to establish suction by a negative head during the filtration, a conduit system including laterals for assisting the washing operation by the admission of air into the filter bed during the reverse flow, said laterals being connected so as to receive air at either end while in action, a water supply pipe connecting with the air conduit system, and means leading from said air conduit system outward from the filter bed, through which foreign material collecting in the laterals and in other parts of the air conduit system may be blown out; substantially as described.

4. A filtration apparatus having a filter bed, a conduit system contained in said filter bed for collecting the filtered water and for washing the filter bed by a reverse flow, an air conduit system including laterals for assisting the washing operation by the admission of air into the filter bed during the reverse flow, and auxiliary pipes leading from the ends of said laterals through the wall of the filter bed, through which pipes the laterals and other parts of the air conduit system may be blown off to free the system from foreign material; substantially as described.

5. A filtration apparatus having a filter bed, a conduit system contained in said filter bed for collecting the filtered water and for washing the filter bed by a reverse flow, the said system being provided with a discharge pipe whose outlet is below the filter bed so as to establish suction by a negative head during the filtration, an air conduit system with laterals free from dead-ends for assisting the washing operation by the admission of air into the filter bed during the reverse flow and blow-off pipes communicating with said air conduit system and leading outward from the laterals of the filter bed, said blow-off pipes being valve-controlled to provide for the exit therethrough of material to be removed from the air conduit system; substantially as described.

6. A filtering apparatus having a filter bed, a conduit system contained in said filtering bed for collecting the filtered water and for washing the filter bed by a reverse flow, a second conduit system contained in said filtering bed for assisting the washing operation by the admission of fluid into the filter bed, said second conduit system comprising a plurality of pipes and a plurality of laterals communicating therewith, said laterals each communicating at its ends with a pair of said pipes, said second conduit system being provided with blow-off outlets extending through the wall of said filter bed, and valves for opening and closing said blow-off outlets, whereby when said valves are closed said second conduit system is adapted to be used to assist in washing the filter bed and when said valves are opened said second conduit system may be cleaned.

In testimony whereof I affix my signature, in presence of two witnesses.

WILLIAM A. STEVENSON.

Witnesses:
K. R. POWERS,
F. H. BOYNTON.

Copies of this patent may be obtained for five cents each, by addressing the "Commissioner of Patents, Washington, D. C."